(12) United States Patent
Yu

(10) Patent No.: US 11,398,335 B2
(45) Date of Patent: Jul. 26, 2022

(54) ELECTROMAGNETIC COIL ASSEMBLY FOR CONTROL ROD DRIVING MECHANISM AND METHOD OF MANUFACTURING THE SAME

(71) Applicant: Jie Yu, Shanghai (CN)

(72) Inventor: Jie Yu, Shanghai (CN)

(*) Notice: Subject to any disclaimer, the term of this patent is extended or adjusted under 35 U.S.C. 154(b) by 831 days.

(21) Appl. No.: 16/245,959

(22) Filed: Jan. 11, 2019

(65) Prior Publication Data

US 2019/0221352 A1    Jul. 18, 2019

(30) Foreign Application Priority Data

Jan. 16, 2018 (CN) .......................... 201810041590.0

(51) Int. Cl.
| | |
|---|---|
| *H01F 27/02* | (2006.01) |
| *H01F 27/22* | (2006.01) |
| *H01F 27/32* | (2006.01) |
| *G21C 7/10* | (2006.01) |
| *H01F 41/06* | (2016.01) |
| *H01F 41/12* | (2006.01) |
| *H01F 41/00* | (2006.01) |
| *G21C 9/02* | (2006.01) |

(52) U.S. Cl.
CPC .............. *H01F 27/022* (2013.01); *G21C 7/10* (2013.01); *G21C 9/02* (2013.01); *H01F 27/22* (2013.01); *H01F 27/327* (2013.01); *H01F 41/005* (2013.01); *H01F 41/06* (2013.01); *H01F 41/127* (2013.01)

(58) Field of Classification Search
USPC .......................................... 336/96, 90, 5, 65
See application file for complete search history.

(56) References Cited

U.S. PATENT DOCUMENTS

| | | | | |
|---|---|---|---|---|
| 4,739,825 | A | * | 4/1988 | Van Dusen ............. H01F 27/10 165/104.33 |
| 5,009,834 | A | * | 4/1991 | Tessaro .................... G21C 7/14 376/232 |

(Continued)

FOREIGN PATENT DOCUMENTS

| | | |
|---|---|---|
| CN | 103329209 | 9/2013 |
| CN | 104200949 | 12/2014 |
| CN | 106910589 A * | 6/2017 |

*Primary Examiner* — Shawki S Ismail
*Assistant Examiner* — Kazi S Hossain
(74) *Attorney, Agent, or Firm* — Hauptman Ham, LLP

(57) ABSTRACT

An electromagnetic coil assembly for a control rod driving mechanism, comprising coils and a yoke for embedding the coils, wherein damascene holes are disposed on the yoke, the coils are installed in the damascene holes, the yoke comprises first yokes and second yokes, and the damascene holes are disposed on the first yokes; the first yokes are connected with the second yokes, and a through hole for cooperating with a sealing shell assembly is disposed on the second yokes; and a thermal conductivity of the first yokes is stronger than a thermal conductivity of the second yokes. The method is the processing method of the assembly. The coil assembly provided in technical solution or the coil assembly obtained by the method can remarkably reduce the temperature inside the coil, thereby improving the reliability of the CRDM electromagnetic coil assembly and prolonging the service life of the CRDM electromagnetic coil assembly.

7 Claims, 3 Drawing Sheets

(56) References Cited

U.S. PATENT DOCUMENTS

2008/0036309 A1* 2/2008 Toyama ................ H02K 26/00
  310/36
2020/0011545 A1* 1/2020 Umehara ................ H01F 27/18

* cited by examiner

ELECTROMAGNETIC COIL ASSEMBLY FOR CONTROL ROD DRIVING MECHANISM AND METHOD OF MANUFACTURING THE SAME

CROSS-REFERENCE TO RELATED APPLICATION

This application claims the benefit under 35 U.S.C. § 119 of Chinese Application No. 201810041590.0, filed Jan. 16, 2018, which hereby incorporated in its entirety.

FIELD OF THE INVENTION

The present invention relates to the technical field of the reactor control rod drive mechanism, and more particularly to an electromagnetic coil assembly for a control rod driving mechanism and a method of manufacturing the same.

BACKGROUND OF THE INVENTION

A reactor is a core portion of the nuclear power station. The control rod driving mechanism (CRDM) on the reactor can raise, insert or maintain the position of the control rod in the reactor core to control the fission rate of the reactor, realize starting and stopping the reactor as well as regulating the reactor power, and rapidly insert the control rod (i.e., scram) under accident conditions, which causes the reactor to be scrammed in a short time to ensure the safe operation of the nuclear power station. CRDM cannot realize aforementioned functions without the electromagnetic coil assembly which must have features such as stability, reliability, heat resistance, good insulation performance, radiation resistance and long service life due to the special working environment and extreme importance of the functions thereof.

In the prior art, regarding to the designs of the service life and reliability of the electromagnetic coil, the people skilled in the art made various explorations on the structure of the electromagnetic coil assembly as well as the material of the parts thereof, for example, the invention application No. CN103329209A and the invention application No. 201410500311.4. Further studies on the service life and stability of the electromagnetic coil assembly can definitely further improve the reliability of the control rod driving mechanism.

BRIEF SUMMARY OF THE INVENTION

Further studies on the problems proposed above regarding to the service life and stability of the electromagnetic coil assembly can definitely further improve the reliability of the control rod driving mechanism. The present invention provides an electromagnetic coil assembly for a control rod driving mechanism and a method of manufacturing the same. The coil assembly provided in the present invention or the coil assembly obtained by the method can remarkably reduce the temperature inside the coil, thereby improving the reliability of the CRDM electromagnetic coil assembly and prolonging the service life of the CRDM electromagnetic coil assembly.

The electromagnetic coil assembly for the control rod driving mechanism provided in the present invention solves the problems by following technical points:

an electromagnetic coil assembly for a control rod driving mechanism, comprising one or more coils and a yoke for embedding the one or more coils, wherein one or more damascene holes are disposed on the yoke, the one or more coils are installed in the one or more damascene holes, the yoke comprises at least one first yokes and at least one second yokes, and the one or more damascene holes are disposed on the at least one first yokes;

the at least one first yokes are connected with the at least one second yokes, and a through hole for cooperating with a sealing shell assembly is disposed on the at least one second yokes; and among the at least one first yokes and the at least one second yokes, a thermal conductivity of the at least one first yokes is stronger than a thermal conductivity of the at least one second yokes.

The designs relating to the reliability and service life of the electromagnetic coil assembly for the control rod driving mechanism, in the prior art, include the technical solutions such as the use of the high-temperature resistant non-metallic material as the coil framework, the use of the metallic material having a better temperature tolerance as the coil framework, and reinforcement of the heat dispersion of the coils.

In the present technical solution, the first yokes and the second yokes are respectively used as parts of the yoke. Meanwhile, the coils are all installed on the first yokes through the damascene holes disposed on the first yokes. Therefore, when such assembly is cooperated with the sealing shell assembly, the center holes on the coils and the through holes of the second yokes are served as the passage for the sealing shell assembly to pass through such assembly.

At the same time, in the prior art, since the operating temperature of the CRDM pressure resistant sealing shell assembly located in the center hole of such assembly is about 300° C., the heat transferred from the sealing shell assembly to the coils of such assembly by heat conduction is particularly large. The thermal conductivity of the first yokes is stronger than the thermal conductivity of the second yokes, so that the heat transferred from the second yokes to the first yokes and the coils due to the transfer mode of heat conduction can be effectively reduced, and the heat generated during working process of the coils can be dissipated by the first yokes which have the stronger thermal conductivity. Consequently, the design of the yoke structure provided by the present invention can effectively discharge the heat generated by the coils through the first yokes, while reduce the heat transferred from the sealing shell assembly to the coils, which allow the coils to operate at a relatively low temperature, thereby significantly reducing the temperature inside the coils, improving the reliability of CRDM electromagnetic coil assembly, and extending the service life of the CRDM electromagnetic coil assembly.

Preferably, as specific implementation forms of the first yokes and the second yokes, the material of the first yokes may be pure iron, electromagnetic pure iron and the like, and a plurality of heat dissipating fins are processed on the outer surface of the first yokes to increase the heat dissipating area of the first yokes; the material of the second yokes may be cast iron, martensitic stainless steel, permeability alloy, soft magnetic ferrite, soft magnetic amorphous alloy and the like. The people skilled in the art should appreciate that the thermal conductivity described above refers to the heat conduction capability of the material, and can be represented by the heat conductivity coefficient of the material.

Preferably, the projection of the coils toward the end surface of each of the second yokes falls outside the through hole. The projection of the coils toward the end surface of each of the second yokes is defined to fall outside the through hole, that is to say that the aforementioned projection of the coils is situated outside the through hole, which means, in such assembly, the inner diameter of the passage at the positions of the coils is larger than the inner diameter of the passage at the positions of the second yokes. Therefore, when the assembly is cooperated with the sealing shell assembly, the engagement positions of the assembly and the sealing shell assembly are located at the positions of the second yokes, preventing the coils from directly contacting the sealing shell assembly. Since the structure features provided in the present invention avoids the direct contact between the coils and the sealing shell assembly, there is no direct heat conduction between the coils and the sealing shell assembly.

When the sealing shell assembly is not in direct contact with the coils, the transfer mode of the heat from the sealing shell to the coils becomes to thermal radiation. To further reduce the heat transferred from the sealing shell to the coils through thermal radiation, preferably, the inner hole surface of the coils, namely the hole wall of the center hole of the coils is polished, for example, into a mirror surface to improve the brightness of the inner hole surface of the coils, which can effectively reflect the thermal radiation generated by the sealing shell, further reducing the heat of the coils.

A further technical solution is that:

as specific implementation forms of the damascene holes and the through hole, either the one or more damascene holes or the through hole is a round hole, and an axis of the one or more damascene holes is collinear with an axis of the through hole; and each of the one or more coil comprises an inner frame and a coil winding wound around the inner frame, the inner frame has a cylindrical shape, an axis of the inner frame is collinear with the axis of the one or more damascene holes, and a diameter of a center hole of the inner frame is larger than a diameter of the through hole.

An amount of the at least one first yokes exceeds an amount of the at least one second yokes by one. Two adjacent first yokes of the at least one first yokes are connected by one of the at least one second yokes. The one or more damascene holes are disposed on each of the at least one first yokes, and the one or more coils are installed in each of the one or more damascene holes. In such technical solution, the first yokes are in an interval distribution, allowing better external heat dissipation environment of the single first yoke. In such technical solution, the amount of the first yokes exceeds the amount of the second yokes by one, which actually aims to define that one of the second yokes is disposed between two adjacent first yokes. It is understood that the one of the second yokes used herein also refers to a second yoke disposed between two first yokes. If a second yoke is connected to the outer side of the first yoke located at the end portion of the assembly to form an additional connection portion between the assembly and a containment assembly, the additional second yoke should not be counted in the count range of the above number difference.

As described above, since the materials of the first yokes and the second yokes are different, the first yokes and the second yokes are connected by the bolt which is a detachable connection form not affecting the properties of the first yokes and second yokes during connection. Also, a sealing ring is disposed on the connecting surface of the first yokes and the second yokes. The sealing ring is used for sealing the inner side and the outer side of the assembly, that is to say that the sealing ring provides a radial seal, having characteristics of improving the moisture resistance of the coils of the assembly. Preferably, as the electromagnetic coil assembly for the control rod driving mechanism generally contains three coils, the end portions of the assembly are both the second yokes. Meanwhile, each of the second yokes at the end portions is also provided with an annular sealing groove for installing the sealing ring to realize the axial sealing of the assembly. Such structure form also facilitates the increase of the contact area of the assembly and the sealing shell assembly, as well as the reliability of the connection of the assembly and the sealing shell assembly.

As an implementation that the coils can be completely enclosed in the first yokes, the depth of each of the one or more damascene holes is equal to or greater than a length of each of the one or more coils. A space between a hole wall of each of the one or more damascene holes and each of the one or more coils is filled with a potting layer.

Two end faces of each of the one or more coils are both located between two end faces of each of the one or more damascene holes, or the two end faces of each of the one or more coils are respectively coincident with the two end faces of each of the one or more damascene holes. In such technical solution, the first yokes are able to protect the coils and act as the outer frames (i.e. outer shells) of the coils, which facilitate simplifying the structure design of the coils. The above potting layer not only facilitates the structure stability of the assembly, but also makes the seismic performance of the assembly stronger. Meanwhile, the above potting layer is beneficial to heat conduction between the coils and the first yokes.

A wire hole is disposed on the at least one first yokes and the at least one second yokes. The wire hole disposed on the at least one first yokes and the one or more damascene holes are holes relatively independent from each other. The wire hole disposed on the at least one second yokes and the through hole are holes relatively independent from each other. Further definition that the wire hole and the damascene holes are relatively independent holes aims to separate the wire hole from the damascene holes, thereby effectively preventing the potting material from blocking the wire hole when the potting layer is disposed, which may affects the treading operation during the subsequent fitting of components. Moreover, separating the wire hole from the damascene holes can also avoid waste of the potting material or poor potting effect caused by the loss of the potting material from the wire hole when the potting process is carried out to obtain the potting layer. People skilled in the art should appreciate that the wire hole is not disposed on all of the first yokes and the second yokes. For example, according to the practical needs, usually the second yoke at one end of the electromagnetic coil assembly and the first yoke connected thereto are not provided with the wire hole.

In order to improve the heat dispersion of an end portion of each of the one or more coils, the end portion of each of the one or more coils is also covered with the potting layer. At the same time, after the above potting layer is disposed, the length of the combination of the potting layer and the coils is controllable. Therefore, the length of the combination can be slightly larger than the depth of the damascene holes, so that when two adjacent first yokes are connected to one second yoke, the potting layer of the end portions may be compressed to seal the first yokes and the second yoke at the end portions of the coils.

To improve the thermal conductivity of the potting layer, the potting layer is further embedded with thermally conductive insulating particles, wherein the thermally conductive insulating particles can use quartz sands, flint silica sands, PPS polyphenylene sulfide, PA46 nylon and the like.

Furthermore, the present invention also provides a method of manufacturing an electromagnetic coil assembly for a control rod driving mechanism, wherein the method is used to manufacture any one of the aforementioned electromagnetic coil assemblies for the control rod driving mechanism. The method comprises following steps carried out in sequence:

S1. winding the coil winding around an inner frame to obtain the one or more coils, and embedding the obtained one or more coils in the one or more damascene holes of the at least one first yokes;

S2. integrally potting an assembly consisting of the one or more coils and the at least one first yokes to obtain a potting layer in a space between a hole wall of each of the one or more damascene holes and each of the one or more coils; and S3. completing an assembly of the at least one first yokes and the at least one second yokes.

Such technical solution is the processing method of the electromagnetic coil assembly for the control rod driving mechanism provided above.

Preferably, a specific form of the assembly in S3 uses a bolted connection. A sealing ring is disposed on a connecting surface of the at least one first yokes and the at least one second yokes.

The present invention has the following beneficial effect:

The structure of the electromagnetic coil assembly provided in the present invention and the product obtained by the manufacturing method provided in the present invention have the following features:

Since the structure features provided in such technical solution avoids the direct contact between the coils and the sealing shell assembly, there is no direct heat conduction between the coils and the sealing shell assembly. Meanwhile, the thermal conductivity of the first yokes is stronger than the thermal conductivity of the second yokes, so that the heat transferred from the second yokes to the first yokes and the coils due to heat conduction can be effectively reduced, and the heat generated during working process of the coils can be dissipated by the first yokes which have the stronger thermal conductivity. As a result, the design of the yoke structure provided by the technical solution can effectively discharge the heat generated by the coils through the first yokes, while reduce the heat transferred from the sealing shell assembly to the coils, which allow the coils to operate at a relatively low temperature, thereby significantly reducing the temperature inside the coils, improving the reliability of CRDM electromagnetic coil assembly, and extending the service life of the CRDM electromagnetic coil assembly.

BRIEF DESCRIPTION OF THE DRAWINGS

Annotations in the figures and names of the corresponding parts are: 1. first yoke, 11. damascene hole, 12. wiring hole, 2. potting layer, 3. coil, 4. inner frame, 5. second yoke, 6. bolt, 7. sealing ring.

DETAILED DESCRIPTION OF THE PREFERRED EMBODIMENTS

The present invention is further described in detail below with reference to the embodiments, but it is understood that the structure of the present invention is not limited to the following embodiments.

Embodiment 1

Figure 1:
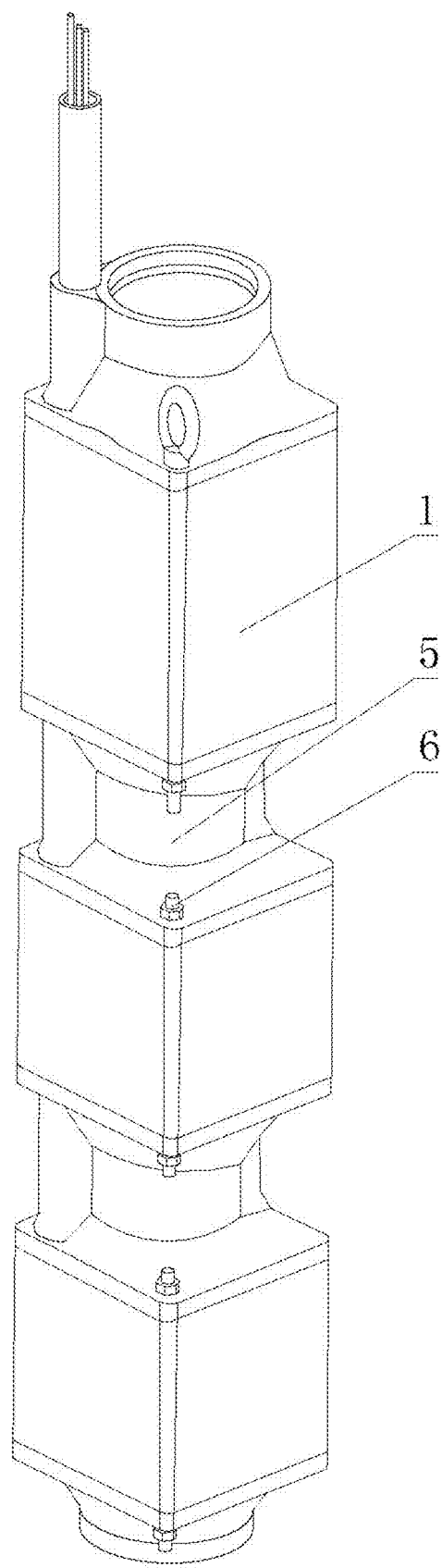
FIG. 1 is a schematic perspective structural view of the electromagnetic coil assembly for the control rod driving mechanism according to one embodiment of the present invention.
Figure 2:
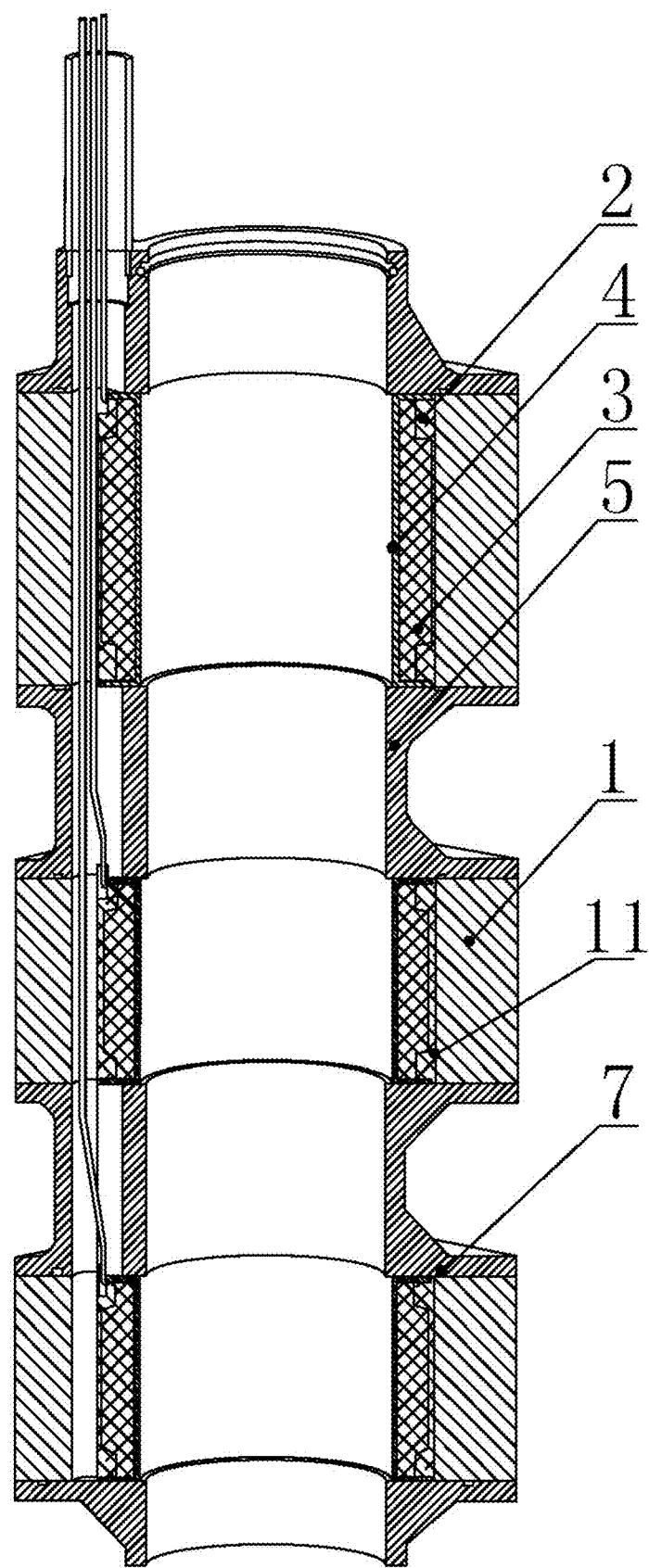
FIG. 2 is a schematic sectional structural view of the electromagnetic coil assembly for the control rod driving mechanism according to one embodiment of the present invention.
Figure 3:
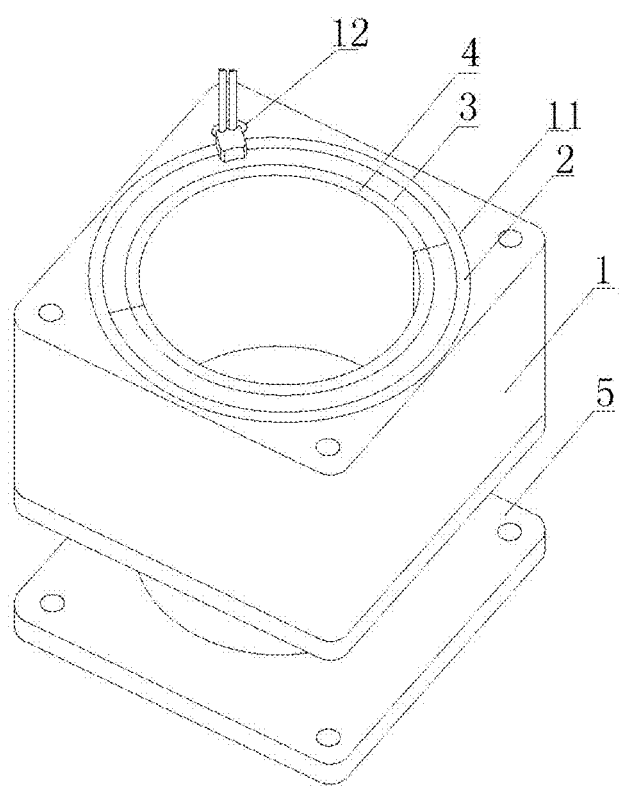
FIG. 3 is a schematic view reflecting the connection relation of the coil and the first yoke and the connection relation of the first yoke and the second yoke in one embodiment regarding to the electromagnetic coil assembly for the control rod driving mechanism provided in the present invention.

As shown in FIG. 1 to FIG. 3, an electromagnetic coil assembly for a control rod driving mechanism, comprising one or more coils 3 and a yoke for embedding the one or more coils 3, wherein one or more damascene holes 11 are disposed on the yoke, the one or more coils 3 are installed in the one or more damascene holes 11, the yoke comprises at least one first yokes 1 and at least one second yokes 5, and the one or more damascene holes 11 are disposed on the at least one first yokes 1;

the at least one first yokes 1 are connected with the at least one second yokes 5, and a through hole for cooperating with a sealing shell assembly is disposed on the at least one second yokes 5, a projection of the one or more coils 3 toward the end surface of each of the second yokes 5 falls outside the through hole;

among the at least one first yokes 1 and the at least one second yokes 5, a thermal conductivity of the at least one first yokes 1 is stronger than a thermal conductivity of the at least one second yokes 5.

The designs relating to the reliability and service life of the electromagnetic coil assembly for the control rod driving mechanism, in the prior art, include the technical solutions such as the use of the high-temperature resistant non-metallic material as the coil framework, the use of the metallic material having a better temperature tolerance as the coil framework, and reinforcement of the heat dispersion of the coils 3.

In the present technical solution, the first yokes 1 and the second yokes 5 are respectively used as parts of the yoke. Meanwhile, the coils 3 are all installed on the first yokes 1 through the damascene holes 11 disposed on the first yokes 1. Therefore, when such assembly is cooperated with the sealing shell assembly, the center holes on the coils 3 and the through holes of the second yokes 5 are served as the passage for the sealing shell assembly to pass through such assembly. In the technical solution, the through holes for cooperating with the sealing shell assembly are disposed on the second yokes 5. The projection of the coils 3 toward the end surface of each of the second yokes 5 falls outside the through hole, that is to say that the aforementioned projection of the coils 3 is situated outside the through hole, which means, in such assembly, the inner diameter of the passage at the positions of the coils 3 is larger than the inner diameter of the passage at the positions of the second yokes 5. Therefore, when the assembly is cooperated with the sealing shell assembly, the engagement positions of the assembly and the sealing shell assembly are located at the positions of the second yokes 5, preventing the coils 3 from directly contacting the sealing shell assembly.

At the same time, in the prior art, since the operating temperature of the CRDM pressure resistant sealing shell assembly located in the center hole of such assembly is about 300° C., the heat transferred from the sealing shell assembly to the coils 3 of such assembly by heat conduction is particularly large. However, as the structure features provided in such technical solution avoids the direct contact between the coils 3 and the sealing shell assembly, there is no direct heat conduction between the coils 3 and the sealing shell assembly. In addition, the thermal conductivity of the first yokes 1 is stronger than the thermal conductivity of the second yokes 5, so that the heat transferred from the second yokes 5 to the first yokes 1 and the coils 3 due to heat conduction can be effectively reduced, and the heat generated during working process of the coils 3 can be dissipated by the first yokes 1 which have the stronger thermal conductivity. Consequently, the design of the yoke structure provided by the technical solution can effectively discharge the heat generated by the coils 3 through the first yokes 1, while reduce the heat transferred from the sealing shell assembly to the coils 3, which allow the coils 3 to operate at a relatively low temperature, thereby significantly reducing the temperature inside the coils 3, improving the reliability of CRDM electromagnetic coil assembly, and extending the service life of the CRDM electromagnetic coil assembly.

Preferably, as specific implementation forms of the first yokes 1 and the second yokes 5, the material of the first yokes 1 may be pure iron, electromagnetic pure iron and the like, and a plurality of heat dissipating fins are processed on the outer surface of the first yokes 1 to increase the heat dissipating area of the first yokes 1; the material of the second yokes 5 may be cast iron, martensitic stainless steel, permeability alloy, soft magnetic ferrite, soft magnetic amorphous alloy and the like.

Embodiment 2

As shown in FIG. 1 to FIG. 3, embodiment 2 is further defined on the basis of embodiment 1: as specific implementation forms of the damascene holes 11 and the through hole, either the one or more damascene holes 11 or the through hole is a round hole, and an axis of the one or more damascene holes 11 is collinear with an axis of the through hole; and each of the one or more coil 3 comprises an inner frame 4 and a coil winding wound around the inner frame 4, the inner frame 4 has a cylindrical shape, an axis of the inner frame 4 is collinear with the axis of the one or more damascene holes 11, and a diameter of a center hole of the inner frame 4 is larger than a diameter of the through hole.

An amount of the at least one first yokes 1 exceeds an amount of the at least one second yokes 5 by one. Two adjacent first yokes 1 of the at least one first yokes 1 are connected by one of the at least one second yokes 5. The one or more damascene holes 11 are disposed on each of the at least one first yokes 1, and the one or more coils 3 are installed in each of the one or more damascene holes 11. In such technical solution, the first yokes 1 are in an interval distribution, allowing better external heat dissipation environment of the single first yoke.

As described above, since the materials of the first yokes 1 and the second yokes 5 are different, the first yokes 1 and the second yokes 5 are connected by the bolt 6 which is a detachable connection form not affecting the properties of the first yokes 1 and second yokes 5 during connection. Also, a sealing ring 7 is disposed on the connecting surface of the first yokes 1 and the second yokes 5. The sealing ring 7 is used for sealing the inner side and the outer side of the assembly, that is to say that the sealing ring 7 provides a radial seal, having characteristics of improving the moisture resistance of the coils 3 of the assembly. Preferably, as the electromagnetic coil assembly for the control rod driving mechanism generally contains three coils 3, the end portions of the assembly are both the second yokes 5. Meanwhile, each of the second yokes 5 at the end portions is also provided with an annular sealing groove for installing the sealing ring to realize the axial sealing of the assembly. Such structure form also facilitates the increase of the contact area of the assembly and the sealing shell assembly, as well as the reliability of the connection of the assembly and the sealing shell assembly.

As an implementation that the coils 3 can be completely enclosed in the first yokes 1, the depth of each of the one or more damascene holes 11 is equal to or greater than a length of each of the one or more coils 3. A space between a hole wall of each of the one or more damascene holes 11 and each of the one or more coils 3 is filled with a potting layer 2.

Two end faces of each of the one or more coils 3 are both located between two end faces of each of the one or more damascene holes 11, or the two end faces of each of the one or more coils 3 are respectively coincident with the two end faces of each of the one or more damascene holes 11. In such technical solution, the first yokes 1 are able to protect the coils 3 and act as the outer frames of the coils 3, which facilitate simplifying the structure design of the coils 3. The above potting layer 2 not only facilitates the structure stability of the assembly, but also makes the seismic performance of the assembly stronger. Meanwhile, the above potting layer 2 is beneficial to heat conduction between the coils 3 and the first yokes 1.

A wire hole 12 is disposed on the at least one first yokes 1 and the at least one second yokes 5. The wire hole 12 disposed on the at least one first yokes 1 and the one or more damascene holes 11 are holes relatively independent from each other. The wire hole 12 disposed on the at least one second yokes 5 and the through hole are holes relatively independent from each other. Further definition that the wire hole 12 and the damascene holes 11 are relatively independent holes aims to separate the wire hole 12 from the damascene holes 11, thereby effectively preventing the potting material from blocking the wire hole 12 when the potting layer 2 is disposed, which may affects the treading operation during the subsequent fitting of components. Moreover, separating the wire hole from the damascene holes can also avoid waste of the potting material or poor potting effect caused by the loss of the potting material from the wire hole 12 when the potting process is carried out to obtain the potting layer 2.

In order to improve the heat dispersion of an end portion of each of the one or more coils 3, the end portion of each of the one or more coils 3 is also covered with the potting layer 2. At the same time, after the above potting layer 2 is disposed, the length of the combination of the potting layer 2 and the coils 3 is controllable. Therefore, the length of the combination can be slightly larger than the depth of the damascene holes 11, so that when two adjacent first yokes 1 are connected to one second yoke 5, the potting layer 2 of the end portions may be compressed to seal the first yokes 1 and the second yoke 5 at the end portions of the coils 3.

To improve the thermal conductivity of the potting layer 2, the potting layer 2 is further embedded with thermally conductive insulating particles, wherein the thermally conductive insulating particle can use quartz sands, flint silica sands, PPS polyphenylene sulfide, PA46 nylon and the like.

Embodiment 3

Embodiment 3 provides a method of manufacturing an electromagnetic coil assembly for a control rod driving mechanism, wherein the method is used to manufacture any one of the aforementioned electromagnetic coil assemblies for the control rod driving mechanism. The method comprises following steps carried out in sequence:

S1. winding the coil winding around an inner frame 4 to obtain the one or more coils 3, and embedding the obtained one or more coils 3 in the one or more damascene holes 11 of the at least one first yokes 1;

S2. integrally potting an assembly consisting of the one or more coils 3 and the at least one first yokes 1 to obtain a potting layer 2 in a space between a hole wall of each of the one or more damascene holes 11 and each of the one or more coils 3; and S3. completing an assembly of the at least one first yokes 1 and the at least one second yokes 5.

Such technical solution is the processing method of any one of the electromagnetic coil assembly for the control rod driving mechanism provided by any one of the aforementioned embodiments.

Preferably, a specific form of the assembly in S3 uses a bolted connection. A sealing ring 7 is disposed on a connecting surface of the at least one first yokes 1 and the at least one second yokes 5.

The content described above is a further detailed description of the present invention with reference to the preferred embodiments, and the embodiments of the present invention should not be limited to the description. For the ordinary people skilled in the art, the other embodiments obtained without departing from the technical solutions of the present invention should be included in the scope of the present invention.

What is claimed is:

1. An electromagnetic coil assembly for a control rod driving mechanism, comprising one or more coils and a yoke for embedding the one or more coils, wherein one or more damascene holes are disposed on the yoke, the one or more coils are installed in the one or more damascene holes, the yoke comprises at least one first yokes and at least one second yokes, and the one or more damascene holes are disposed on the at least one first yokes;

the at least one first yokes are connected with the at least one second yokes, and a through hole for cooperating with a sealing shell assembly is disposed on the at least one second yokes;

among the at least one first yokes and the at least one second yokes, the materials of the first yokes and the second yokes are different, a thermal conductivity of the at least one first yokes is stronger than a thermal conductivity of the at least one second yokes;

either the one or more damascene holes or the through hole is a round hole, and an axis of the one or more damascene holes is collinear with an axis of the through hole;

each of the one or more coil comprises an inner frame and a coil winding wound around the inner frame, the inner frame has a cylindrical shape, an axis of the inner frame is collinear with the axis of the one or more damascene holes, and a diameter of a center hole of the inner frame is larger than a diameter of the through hole; and projection of the one or more coils toward an end surface of each of the second yokes falls outside the through hole.

2. The electromagnetic coil assembly for the control rod driving mechanism according to claim 1, wherein an amount of the at least one first yokes exceeds an amount of the at least one second yokes by one, two adjacent first yokes of the at least one first yokes are connected by one of the at least one second yokes, the one or more damascene holes are disposed on each of the at least one first yokes, and the one or more coils are installed in each of the one or more damascene holes.

3. The electromagnetic coil assembly for the control rod driving mechanism according to claim 1, wherein the at least one first yokes and the at least one second yokes are connected by a bolt, and a sealing ring is disposed on a connecting surface of the at least one first yokes and the at least one second yokes.

4. The electromagnetic coil assembly for the control rod driving mechanism according to claim 1, wherein a depth of each of the one or more damascene holes is equal to or greater than a length of each of the one or more coils, and a space between a hole wall of each of the one or more damascene holes and each of the one or more coils is filled with a potting layer; and two end faces of each of the one or more coils are both located between two end faces of each of the one or more damascene holes, or the two end faces of each of the one or more coils are respectively coincident with the two end faces of each of the one or more damascene holes.

5. The electromagnetic coil assembly for the control rod driving mechanism according to claim 1, wherein a wire hole is disposed on the at least one first yokes and the at least one second yokes, the wire hole disposed on the at least one first yokes and the one or more damascene holes are holes relatively independent from each other, and the wire hole disposed on the at least one second yokes and the through hole are holes relatively independent from each other.

6. The electromagnetic coil assembly for the control rod driving mechanism according to claim 4, wherein an end portion of each of the one or more coils is also covered with the potting layer.

7. The electromagnetic coil assembly for the control rod driving mechanism according to claim 4, wherein the potting layer is further embedded with thermally conductive insulating particles.

\* \* \* \* \*